US012734886B2

(12) United States Patent
Lessmann et al.

(10) Patent No.: US 12,734,886 B2
(45) Date of Patent: Sep. 15, 2026

(54) VEHICLE, FLEET, AND METHOD FOR TREATING ENVIRONMENT AIR

(71) Applicant: MANN+HUMMEL Ventures Pte. Ltd., Singapore (SG)

(72) Inventors: Rudolf Lessmann, Singapore (SG); Markus Kolczyk, Mundelsheim (DE)

(73) Assignee: MANN+HUMMEL Ventures Pte. Ltd., Singapore (SG)

( * ) Notice: Subject to any disclaimer, the term of this patent is extended or adjusted under 35 U.S.C. 154(b) by 386 days.

(21) Appl. No.: 18/499,202

(22) Filed: Oct. 31, 2023

(65) Prior Publication Data

US 2024/0246017 A1 Jul. 25, 2024

(30) Foreign Application Priority Data

Jan. 20, 2023 (EP) .................................... 23152573

(51) Int. Cl.
*B60K 35/85* (2024.01)
*B01D 46/42* (2006.01)
(Continued)

(52) U.S. Cl.
CPC ............ *B60K 35/85* (2024.01); *B01D 46/429* (2013.01); *B01D 46/46* (2013.01); *B60H 3/06* (2013.01); *H04W 4/46* (2018.02); *B01D 2258/06* (2013.01); *B01D 2259/4558* (2013.01); *B60H 1/00657* (2013.01); *B60H 1/00771* (2013.01); *B60K 2360/5915* (2024.01); *B60R 16/023* (2013.01); *F24F 8/99* (2021.01);
(Continued)

(58) Field of Classification Search
None
See application file for complete search history.

(56) References Cited

U.S. PATENT DOCUMENTS

2017/0113517 A1 4/2017 Kwon et al.
2017/0166209 A1 6/2017 Mathissen et al.
2018/0337801 A1 11/2018 Hirsch
2019/0118140 A1 4/2019 Fingland et al.
2019/0149598 A1 5/2019 Sawada et al.
2020/0122549 A1* 4/2020 Seki .................. B60H 1/00807
(Continued)

FOREIGN PATENT DOCUMENTS

CN 115362667 A 11/2022
DE 202006019335 U1 4/2008
(Continued)

OTHER PUBLICATIONS

EPO extended Search Report in corresponding EPO Appln. No. 23152573.4, Jul. 18, 2023, Munich, Germany.

*Primary Examiner* — Gabriel E Gitman

(57) ABSTRACT

A method of treating environmental air by a supply vehicle configured to communicate with external interfaces via a first communication channel and a second communication channel, the method including: —receiving, on a supply vehicle and via the second communication channel, a request for treatment; —determining, by a control circuit of the supply vehicle, that an air treatment system has an additional treatment capacity available; —sending, from the supply vehicle and via the second communication channel, an acknowledgement, wherein the first communication channel has a lower latency than the second communication channel; and by the control circuit of the supply vehicle, controlling the air treatment system of the supply vehicle to increase treatment capacity. Air treatment system and vehicle configured to carry out the method.

20 Claims, 7 Drawing Sheets

(51) Int. Cl.

| | |
|---|---|
| ***B01D 46/46*** | (2006.01) |
| ***B60H 3/06*** | (2006.01) |
| ***B60R 16/023*** | (2006.01) |
| ***H04W 4/46*** | (2018.01) |
| *B60H 1/00* | (2006.01) |
| *F24F 8/99* | (2021.01) |
| *G07C 5/00* | (2006.01) |
| *G08G 1/00* | (2006.01) |
| *H04L 67/12* | (2022.01) |
| *H04W 4/70* | (2018.01) |

(52) U.S. Cl.

CPC ............... *G07C 5/008* (2013.01); *G08G 1/22* (2013.01); *H04L 67/12* (2013.01); *H04W 4/70* (2018.02)

(56) References Cited

U.S. PATENT DOCUMENTS

| | | | |
|---|---|---|---|
| 2020/0348033 | A1 | 11/2020 | Krüger |
| 2021/0063281 | A1 | 3/2021 | Niemann et al. |
| 2022/0070252 | A1 | 3/2022 | Sawada et al. |
| 2023/0294031 | A1 | 9/2023 | Kolczyk |

FOREIGN PATENT DOCUMENTS

| | | | |
|---|---|---|---|
| DE | 102017008745 | A1 | 3/2018 |
| DE | 102017209476 | A1 | 12/2018 |
| DE | 102019004292 | A1 | 12/2020 |
| DE | 102019208753 | A1 | 12/2020 |
| FR | 3111848 | A1 | 12/2021 |
| KR | 20190118936 | A | 10/2019 |
| KR | 102232950 | B1 | 3/2021 |

* cited by examiner

VEHICLE, FLEET, AND METHOD FOR TREATING ENVIRONMENT AIR

CROSS-REFERENCE TO RELATED APPLICATION

This application claims the benefit of European Application No. 23152573.4 filed on Jan. 20, 2023, the entire disclosure of which is incorporated herein by reference for all purposes.

BACKGROUND

An aspect of the disclosure relates to a vehicle. Another aspect of the disclosure relates to a fleet of two or more vehicles. Another aspect of the disclosure relates to a method of treating environmental air by a vehicle.

Due to progressive urbanization, the problem exists that the ambient air can exceed limit values for particulate matter and/or gases such as ozone, NOx, CO many times over, especially in certain weather conditions (no rain, inversion, low wind speeds, no air exchange between altitudes), as a result of industrial waste gases, road traffic and private fireplaces.

The problem of traffic-related emissions has recently been exacerbated by calls for driving bans for certain groups of vehicles, especially diesel cars and other internal combustion engine vehicles, in areas of particularly high air pollution due to their NOx and particular matter emissions. Ambient air filtration has been proposed in DE202006019335 U1 to reduce the net emission footprint of an internal combustion vehicle and requires that the internal combustion vehicle has an air filter which may have limited air treatment capacity.

Therefore, there persists the problem to provide for improved air cleaning.

SUMMARY

An aspect of the disclosure relates to a vehicle including an air treatment system for treating environment air. The vehicle may further include a control circuit, and a communication interface configured to wirelessly send and receive data external to the vehicle and operably coupled to the control circuit. The control circuit may be configured to, via the communication interface, receive a request for treatment. The control circuit may be further configured to determine if the air treatment system has an additional treatment capacity available. The control circuit may be further configured to, via the communication interface, send an acknowledgement if additional treatment capacity may be available, and may be further configured to control the air treatment system to increase treatment capacity. The communication interface may include a first communication channel and a second communication channel. The first communication channel may have a lower latency than the second communication channel. The second communication channel configured to send and receive air treatment data, and may include the receiving the request for treatment and sending the acknowledgement.

An aspect of the disclosure relates to a method of treating environmental air by a supply vehicle configured to communicate with external interfaces (e.g., of a demand vehicle) via a first communication channel and a second communication channel. The method may include receiving, on a supply vehicle and via the second communication channel, a request for treatment. The method may include determining, by a control circuit of the supply vehicle, that an air treatment system has an additional treatment capacity available. The method may include sending, from the supply vehicle and via the second communication channel, an acknowledgement, wherein the first communication channel may have a lower latency than the second communication channel. The method may include by the control circuit of the supply vehicle, controlling the air treatment system of the supply vehicle to increase treatment capacity.

An aspect of the disclosure relates to a fleet of two or more vehicles, the two or more vehicles operably communicable with each other, wherein a first vehicle may be configured to, via the second communication channel, requesting a second vehicle to provide air treatment, and wherein the second vehicle may be configured to, via the second communication channel, receive the request and control an air treatment system of the second vehicle to increase treatment capacity.

DETAILED DESCRIPTION

Figure 1A:
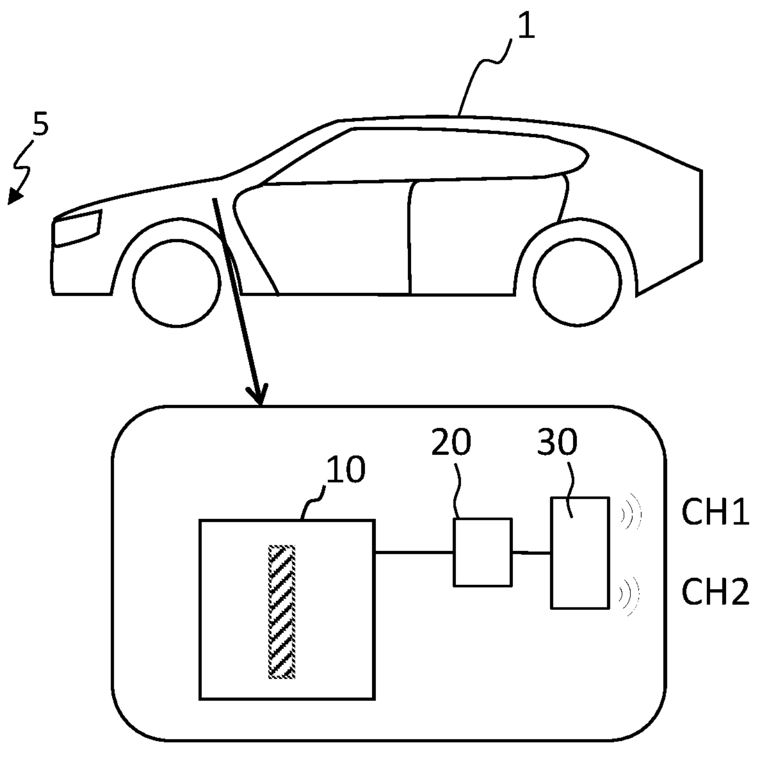
FIGS. 1A and 1B show a vehicle 1 including an air treatment system 10 for treating environment air 5 and a method 100 for treating environment air, respectively.

An aspect of the disclosure concerns air treatment system for treating environment air, the air treatment system configured to be installed and/or be part of a vehicle. Various embodiments relate to a vehicle including an air treatment system for treating environment air. The vehicle may be a supply vehicle. The vehicle may further include a control circuit, and a communication interface configured to wirelessly send and receive data external to the vehicle and operably coupled to the control circuit. The control circuit may be configured to, via the communication interface, receive a request for treatment. The request for treatment may be from external to the vehicle. The control circuit may be further configured to determine if the air treatment system has an additional treatment capacity available. The control circuit may be further configured to, via the communication interface, send an acknowledgement if additional treatment capacity is available, and may be further configured to control the air treatment system to increase treatment capacity. The communication interface may include a first communication channel and a second communication channel. The first communication channel may have a lower latency than the second communication channel. The second communication channel configured to send and receive air treatment data, and may include the receiving the request for treatment and sending the acknowledgement.

According to various embodiments, the vehicle may be a demand vehicle, and may be configured to, via a demand side control circuit and via a supply side communication interface configured to wirelessly send and receive data to the supply vehicle, send the request for treatment to the supply vehicle. According to various embodiments, the demand side control circuit may be further configured to determine if there is treatment demand when a local treatment requirement is unsatisfied. The demand side control circuit may be further configured to if there is a treatment demand, via the demand side communication interface, send a request for remote treatment capacity and receive an acknowledgment. The demand side control circuit may be further configured to provide (e.g., record) data indicative of the additional treatment capacity utilized on a memory, e.g., on a filter. In examples, the memory may be implemented as any electronic circuit capable of storing information, such as based on D-flip-flips, and/or flash memory. In examples, the memory may be, without limitation, a local memory, a remote memory, a cache, a non-volatile memory, or a combination thereof.

According to various embodiments, treatment includes filtration and treating includes filtering.

According to various embodiments, the acknowledgement may indicate that a requested additional treatment capacity is available and/or the acknowledgment may include a data indicative of the additional treatment capacity available.

As used herein and in accordance with various embodiments, the vehicle may be a supply vehicle, may be a demand vehicle, or may be a vehicle that can operate at times as a supply and at other times as a demand vehicle. References to "one vehicle" or to an "other vehicle" may mean any vehicle in accordance with various embodiments, wherein the "one" and "other" are only used to distinguish the vehicles.

According to various embodiments, to increase treatment capacity may mean to increase treatment capacity by the additional treatment capacity. If the additional treatment capacity is fully utilized, then a total treatment may be stored in memory as a sum of the local treatment capacity and the additional treatment capacity(ies). In some embodiments, the air treatment system and/or the method in accordance with various embodiments, may be configured so that on acknowledgement the additional treatment capacity is fully utilized.

According to various embodiments, a total treatment may be recorded in memory, e.g., if the total capacity is utilized, the total treatment may be a sum of the local treatment capacity and one or more additional treatment capacities. As used herein and in accordance with various embodiments, additional treatment (e.g., as in additional treatment capacity) may mean remote treatment. In some embodiments, the total treatment (e.g., total capacity is utilized) may be stored in a memory of the demand vehicle and in a memory of the supply vehicle, this allows the data from both memories to be used for accounts reconciliation.

According to various embodiments, to receive a request for treatment may include to receive data indicative of a require capacity also named herein as treatment demand, or simply demand. According to various embodiments, determine if the air treatment system has additional treatment capacity available may include determine whether the additional treatment capacity is greater or equal to the demand. For example, the capacity could be a capacity per predetermined time slot, e.g., provided by a "heartbeat" clock used by the control circuit, which could also be known, pre-determined, and/or transmitted to the demand vehicle. Another timing could be used, e.g., a time frame for treatment could be determined during by a communication handshaking.

According to various embodiments, the acknowledgement may include data indicative of a cost rate of the additional treatment capacity. The control circuit may be further configured to, before to control the air treatment system to increase treatment capacity, receive a request confirmation. Optionally, the request confirmation may include a microtransaction (such as a micropayment) or micropayment indication data. A micropayment may correlate, e.g., with energy expenditure for air treatment, and/or cost associated with pollution. According to various embodiments, treatment includes filtration and treating includes filtering.

According to various embodiments, the first communication channel and the second communication channel may be distinguished by different protocols, different kind of modulation, different frequency, different standard, a different priority for data in a same pipe, a different number of intermediate communication circuits, or a combination thereof. As used herein and in accordance with various embodiments, intermediate communication circuits may be, a transponder, a transceiver, a relaying radio, a telecommunication infrastructure, a satellite, or another electronic and/or optical circuit. In non-limiting examples, the first channel may be provided by the 5G standard, e.g., a direct vehicle to vehicle connection. In non-limiting examples, the second channel may be provided by a 4G, Bluetooth, wireless, a Low-Power Wide Area Network (e.g. Lora), or a combination thereof.

According to various embodiments, the first communication channel may have a lower latency than the second communication channel. According to various embodiments, the latency of a channel may be measured by measuring the time for a data packet sent from the control circuit of one vehicle to be received by the control circuit external to the one vehicle (e.g., of another vehicle). For example, a data packet may be sent by the one vehicle and a first corresponding time stamp may be recorded for the moment the instruction to send is performed by the control circuit of the one vehicle, and said time stamp may be compared to a time stamp of the data being received at the control circuit external to the one vehicle (e.g., of the other vehicle). The latency measurement may be performed with a pre-determined number of data packets (e.g., 10000 data packets), and the longest value of all received data packets may be used as the channel latency. In case there is a difference between unidirectional latency in one direction to the other direction, then the longest unidirectional latency may be used as the channel latency in accordance with various embodiments. The data packet size may be, for example, smaller than 1500, bytes for example, 32 bytes. The transmitted data packet transmission frequency may be, e.g., 200 data packets /s.

For example, the first channel may have a latency of 50 ms, or 10 ms, or 5 ms, or 1 ms. For direct connections, a distance between the antennas for latency determination may be selected, for example, 100 m. In examples, the first channel may be provided by the 5G standard, e.g., a direct vehicle to vehicle connection.

For example, the second channel may have a latency of or greater than 1 ms, 5 ms, 10 ms, or 50 ms. For direct connections, a distance between the antennas for latency determination may be selected, for example, 100 m. In examples, the first channel may be provided by the 5G standard, e.g., a direct vehicle to vehicle connection. In examples, the second channel may be provided by a 4G, Bluetooth, wireless, a Low-Power Wide Area Network (e.g. Lora), or a combination thereof.

According to various embodiments, the first communication channel has a higher reliability than the second communication channel. According to various embodiments, the reliability may be determined as the number of received data packets divided by the number of sent data packets, each data packet received within a pre-determined latency limit. The reliability measurement may be performed with a pre-determined number of data packets (e.g., 106 data packets). For direct connections, the latency may be measured for antennas at a pre-determined distance, for example, 100 m. The data packet size may be, for example, smaller than 1500, bytes for example, 32 bytes. The transmitted data packet transmission frequency may be, e.g., 200 data packets /s.

For example, the first channel may have a reliability of 99,998, or greater, for a packet size of 32 bytes, for the pre-determined latency, e.g., of 50 ms, or 10 ms, 5 ms, or 1 ms. For direct connections, a distance between the antennas of both ends (e.g., the one and the other vehicles) for reliability determination may be selected, for example, 100 m. In examples, the first channel may be provided by the 5G standard and/or a direct vehicle to vehicle connection. In examples, the second channel may be provided by a 4G, Bluetooth, wireless, a Low-Power Wide Area Network (e.g. Lora), or a combination thereof.

For measurements of latency and reliability, distances may be pre-determined and measured by means of measuring distance, e.g., ruler, laser distance meter, etc. In accordance with various embodiments, for implementation of a vehicle, a fleet, and/or a method for air treatment, a distance between two vehicles may be determined by any known automated means, such as a radar, lidar, or RSSI signal. For example, using a Received Signal Strength Indicator (RSSI) of a known transmitter, such as bluetooth, e.g., bluetooth 5.1 and above, or others. Triangulation among 3 or more receivers with known position (e.g., GPS) may be used to determine more precise positions if needed. Alternatively or in addition, phase measurements by multiple antennas (2 or more, or an array) may be used to obtaining the direction, which combined with RSSI may give a position of the emitter.

According to various embodiments wirelessly send and receive (wireless communication) data external to the vehicle via the first communication channel may include (e.g., consists of) sending an RF signal from one vehicle and receiving the same RF signal by another vehicle. In some embodiments such wireless communication may be direct. In some embodiments, such wireless communication may be carried out through a limited number of intermediate communication circuits (e.g., a single telecommunication tower relaying communication between two vehicles) as long as the latency requirements are met. As used herein and in accordance with various embodiments, the use of intermediate communication circuits, may mean that the communication is an indirect communication between the end points (e.g., between the vehicle and the other vehicle).

According to some embodiments, wirelessly send and receive (wireless communication) data external to the vehicle via the second communication channel may include (e.g., consists of) sending data from one vehicle and receiving the same data by another vehicle using at one, or a plurality of intermediate communication circuit external to the one and the another vehicle. However, the second communication channel may also be direct, which allows for using a protocol with a higher latency.

According to various embodiments, the communication interface may include a first communication module configured to operate the first communication channel and a second communication module configured to operate the second communication channel. In some embodiments, the first communication module and the second communication module may be on different integrated circuits. In some embodiments, the first communication module and the second communication module may be on different PCBs, and/or in different housings. Alternatively, the first communication module and the second communication module may be on a same housing, and/or on a same PCB. In some embodiments, the first communication channel's and the second communication channel's interfaces may be implemented one a same integrated circuit package (also known as CHIP), and may, for example, use different antenna modules, or, in another example, a same antenna module with an antenna tuner.

According to some embodiments, the control circuit may include a first control circuit operably coupled to the first communication module and a second control circuit operably coupled to the second communication module. Said operably couplings may be separate and/or independent from each other. Thereby, communication via the first communication channel may be controlled by the first control circuit, which may be implemented as an ECU as an example, and may be advantageous for critical communication. Communication via the second communication channel may be controlled by the second control circuit, which may be implemented as an air treatment controller as an example.

According to some embodiments, the second communication module may be on an air treatment system. The air treatment system may include an air filter, and the air filter may include a memory for storing at least one of: filter usage time, estimation of absorbed mass, remaining filter capacity, log of filter time, or a combination thereof. The memory may be operably coupled to the second communication module (e.g., via a part of the control module), thus allowing air treatment information to be stored and read from the memory of the filter. In examples, the first communication module may be operably coupled to the ECU.

The control circuit may be configured to operate the first communication channel and the second communication channel simultaneously and independent from each other.

According to various embodiments, the control circuit may be further configured to determine if there may be treatment demand when a local treatment requirement may be unsatisfied. Further, if there is a treatment demand, the control circuit may be configured to, via the communication interface, send a request for remote treatment capacity and receive an acknowledgment. The control circuit may be further configured to provide on a memory (e.g., the memory of the air filter) data indicative of the additional treatment capacity utilized.

According to various embodiments, the acknowledgement may include data indicative of a cost rate of the additional treatment capacity.

According to various embodiments, the control circuit may be further configured to, before to control the air treatment system to increase treatment capacity, to receive a request confirmation, and control the air treatment system to increase treatment capacity if the request for confirmation is received.

According to various embodiments, the vehicle may include a driving assistant circuit or an autonomous driving circuit, which may be operably connected to the communication interface (for example, to the first communication interface) to send to external and receive from external driving data. Examples, of driving data to be communicate with external to the vehicle (e.g., another vehicle, or road infrastructure) include one or more of: braking information from another vehicle, platooning information with another vehicle, traffic ahead of vehicle in front information, infrastructure data indicative of traffic light change, and others.

Various embodiments relate to a fleet of two or more vehicles in accordance with various embodiments, the two or more vehicles operably communicable with each other, wherein a first vehicle (also referred to as a demand vehicle) may be configured to, via the second communication channel, requesting a second vehicle to provide air treatment. The second vehicle (also referred to as a supply vehicle) may be configured to, via the second communication channel, receive the request and control an air treatment system of the second vehicle to increase treatment capacity. According to various embodiments, treatment includes filtration and treating includes filtering.

According to various embodiments, the first vehicle may be configured to, via the second communication channel, request a plurality of vehicles, including at least the second vehicle, to provide air treatment, and wherein each vehicle of the plurality of vehicles may be capable of (e.g., configure to) receiving the request and, control a respective air treatment system to increase treatment capacity, if there is available capacity.

In some embodiments, the demand vehicle and the supply vehicle may communicate one or more movement data, e.g., routing or velocity vectors, which may serve for determining a distance or an overlap of the second vehicle within a desired region of the first vehicle, such as a radius of a circle centered on the first vehicle, or a region in which the first vehicle has passed or will pass within a pre-determine time. For example movement data of the demand vehicle may be transmitted to the supply vehicle for determination of distance at the supply vehicle, movement data of the supply vehicle may be transmitted to the demand vehicle for determination of distance at the demand vehicle, and/or movement data of the supply vehicle and the demand vehicle may be sent to a processor exterior to both vehicles (e.g., a cloud our another vehicle) for determination of distance.

As used herein and in accordance with various embodiments, the first vehicle and the second vehicle, or further vehicle(s) of the two or more vehicles are a fleet by the fact that they can operate together for air treatment—not necessarily because they are the same type or belong to same company. For example, other vehicles may be part of local traffic but not part of the fleet.

According to various embodiments, the fleet may include three or more vehicles, wherein a first vehicle is configured to request a plurality of vehicles, including at least a second vehicle, to provide air treatment, and wherein each vehicle of the plurality of vehicles is capable of receiving the request and control a respective air treatment system to increase treatment capacity.

Various embodiments relate to a method of air treatment in accordance with various embodiments.

Various embodiments relate to a method of treating environmental air by a supply vehicle configured to communicate with an external interface (also named herein as extra vehicular interface) via a first communication channel and a second communication channel. The method may include receiving, on a supply vehicle and via the second communication channel, a request for treatment. The method may further include determining, by a control circuit of the supply vehicle, that an air treatment system has an additional treatment capacity available. The method may further include sending, from the supply vehicle and via the second communication channel, an acknowledgement. The first communication channel may have a lower latency than the second communication channel. The method may further include, by the control circuit of the supply vehicle, controlling the air treatment system of the supply vehicle to increase treatment capacity. As used herein and in accordance with various embodiments, controlling the air treatment system may include the meaning of operating the air treatment system.

According to various embodiments, the request for treatment may include a pre-determined distance, time, velocity vector, or a combination thereof.

According to various embodiments, the method may further include: sending, by the demand vehicle and via the second communication channel, a request for air treatment by a communication interface to a supply vehicle. The method may further include receiving, by the demand vehicle and via the second communication channel, an acknowledgement from the supply vehicle.

According to various embodiments, the method may further include, by the demand vehicle, determining that there is an air treatment demand by determining that there is a local treatment requirement unsatisfied, before sending the request for air treatment. In this context, the term "local" may include the meaning of from the demand vehicle. When the demand is from the vehicle, that may mean that the demand vehicle has a net emissions higher than a limit.

According to various embodiments, the method may further include providing (e.g., recording), on a local memory of the supply vehicle (e.g., on a memory of an air filter), data indicative of the additional treatment capacity utilized. In examples, the memory may be implemented as any electronic circuit capable of storing information, such as based on D-flip-flips, and/or flash memory. In examples, the memory may be, without limitation, a local memory, a remote memory, a cache, a non-volatile memory, or a combination thereof. According to various embodiments, the acknowledgement may include data indicative of an additional treatment capacity. Such recorded data may be retrieved later, for payment, taxation, taxation offset, net emissions calculation, etc.

According to various embodiments, receiving a request for treatment may include receiving data indicative of a demand. Determining that the air treatment system has additional treatment capacity available may include determining that the additional treatment capacity may be greater or equal to the demand.

According to various embodiments, receiving a request for treatment may include receiving data indicative of a demand. Determining that the air treatment system has additional treatment capacity available may include determining that the additional treatment capacity is greater or equal to the demand.

According to various embodiments, controlling the air treatment system to increase treatment capacity may include the meaning to increase the treatment capacity by the additional treatment capacity.

According to various embodiments, the method may further include before controlling the air treatment system to increase treatment capacity, receiving a request confirmation, optionally including a microtransaction (such as a micropayment) or micropayment indication data. The acknowledgement may include data indicative of a cost rate of the additional treatment capacity.

According to various embodiments, the method may include sending, from the supply vehicle, data indicative of the additional treatment capacity utilized.

According to various embodiments, the method may include receiving, by the demand vehicle, the data indicative of the additional treatment utilized.

Various embodiments relate to a vehicle in accordance with various embodiments.

According to various embodiments, the vehicle may include the air treatment system. As used herein and in accordance with various embodiments, the term environment air may refer to air which is exterior to a vehicle's passenger cabin, example, ambient air also named as air surrounding the vehicle and may pass the vehicle during air treatment by the air treatment system. For embodiments comprising internal combustion engines or fuel cells, the environment air is air exterior to the vehicle that passes through the air treatment system in a flow which may avoid (i.e., separated of) an internal combustion engine or fuel cell air flow. Thus, the air treatment system may be for treating exterior air separated from other systems which directly treat on-vehicle generated pollution such as exhaust treatment. Further, the air treatment system releases treat air into the environment, and does not use it as intake for a combustion or fuel cell reaction.

The vehicle may be a motor-powered vehicle, for example having 2, 3, 4, or more wheels. Examples of the vehicle are passenger car, truck, bus, lorry, or a rail vehicle, for example a locomotive. The vehicle may include an air inlet opening upstream from the air treatment system (e.g. in a front region), for allowing air ingress and an air outlet, downstream from the air treatment system, for allowing air egress. The air inlet opening behind which the ambient air cleaning device is present may in particular be a cooling air inlet opening and may for example be covered by a radiator grille. For example, this may be at the same level as the front headlights with respect to the vertical axis of the vehicle, or may be located below or above them. The cross-sectional area of the air intake opening may be as large as possible so that the largest possible volume of air can be supplied. In some embodiments, the vehicle may be an electric vehicle or a hybrid (internal combustion engine and electrical) vehicle. In some embodiments, the vehicle may be an internal combustion engine (ICE) vehicle (i.e., non-hybrid). For example, such battery of an ICE vehicle may have a relatively large capacity and may operate the fan for a long time (e.g., 1 h or more) without significant drain even if it is not being charge by an alternator. In some embodiments, the vehicle comprises an internal combustion engine and a cooling fluid temperature (from the hot side) may be used as representation of the engine temperature. In some embodiments, the vehicle comprises a fuel cell and a cooling fluid temperature (from the hot side) may be used as representation of the fuel cell temperature. In some embodiments, the vehicle comprises a battery and a thermal exchange system (comprising a coolant fluid) may be envisaged for control the temperature of the battery.

According to various embodiments, the blower may be a fan. The fan may be an electrical fan. In accordance with various embodiments, the fan may operate within a speed range of fan influence (and not operate out of said range), which may be a speed range in which operation of the fan is able to alter the air flow (e.g., the volumetric air flow in m3/s or the mass air flow in kg/s). In other words, out of the speed range of fan influence (within the speed range of non-fan influence) the air flow is substantially determined by the speed of the vehicle and is not alterable by the operation of the fan. Thus, not operating the fan out of the speed range of fan influence saves energy. Speed range of fan influence and the speed range of non-fan influence may be determined by measuring the airstream speed for different vehicle speed with the fan turned at this maximum nominal operation speed. Such measurement may be performed when there is no wind (i.e., external wind that would influence the measurements) and at a known temperature, e.g., T=30° C., without any adverse weather event. With these measurements, a threshold of fan influence may be determined which may be specific for the vehicle type and/or air treatment system type. According to various embodiments, the speed range of fan influence may be from 0 km/h until the threshold of fan influence, and speed range of non-fan influence may be from speeds above the threshold of fan influence. The measurements may be performed for a specific car type and a specific fan type. The results of the measurements may be stored in a vehicle's memory (also named herein as computer memory of the vehicle) for later access, for example, the measurements may be stored in processed form as the pre-determined threshold of fan influence, the speed range of fan influence, or the speed range of non-fan influence. The pre-determined threshold of fan influence may be a single value, optionally including a hysteresis. Alternatively, the pre-determined threshold of fan influence may be different values, which depend on the direction of change of the vehicle speed (accelerating or decelerating) and/or may be offset by a hysteresis. The hysteresis may also be stored in the vehicle's memory for later access.

According to various embodiments, the control circuit may be an or part of an ECU, however the disclosure is not limited thereto. Alternatively, the control circuit may be a separate circuit which is operably connectable with the ECU. In another alternative, the control circuit may comprise a separate circuit and an ECU, the separate circuit operably connectable with the ECU. Similarly, the memory may be in one or distributed in more than of abovementioned devices. Operably connectable may include the meaning of connectable via a data communication bus such as CAN bus.

According to various embodiments, the control circuit may obtain weather data, air quality, and/or air temperature by receiving the data from sensors integrated in (e.g., fixed to) the vehicle, for example upstream of an air treatment means, such as a filter. The sensor or sensors may be configured to measure one or both of: air temperature, air quality data, air relative humidity. A rain sensor may also provide may provide rain information.

According to various embodiments, air quality data may include one or more of PM10 concentration, PM2.5 concentration, PM1 concentration, relative humidity, VOC concentration, NOX concentration. In various embodiments, air quality data may include at least one particulate matter concentration is measured.

Alternatively or in addition to obtaining data from the sensors of the vehicle, said data (or part thereof) may be obtained from a weather database that is external to the vehicle (e.g., via wireless communication), for example from a cloud. Such weather database may be a weather database, e.g., as it is provided by weather service providers. The wireless communication may be provided without limitation, by the cellular infrastructure (3G, 4G, 5G, 6G and above), and/or WIFI. In one example, the wireless communication may be via the second communication channel. The weather database may provide information such as data representing adverse weather event, and/or air quality data.

Adverse weather event as used herein and in accordance with various embodiments may mean at least one of: snow, rain, sand storm, volcanic ash fall.

According to various embodiments, the air treatment system may be a filtration system comprising a filter as a treatment means. The filter may be a particle filter, for example, a PM10 filter, a PM2.5 filter, or a PM1 filter. The filter may be a fine dust air filter.

According to various embodiments, the filter may have a filter element which may include at least one filter medium which may be folded into at least one filter bellows. The filter may include a plurality of fold stabilizing means which support the filter bellows and are present at a lateral distance of e.g., not more than 150 mm from one another, and for example at least 15 mm from one another, for example 70 mm. It may be provided that the filter medium has an intrinsic bending stiffness of at least 1 $Nm^2$, for example, at least 2 $Nm^2$. This refers to an intrinsic bending stiffness of the filter medium, i.e. in an unprocessed/unfolded state. The filter may comprise pleat stabilizing means. The filtration system may comprise one water separating device.

According to various embodiments, the depth of the filter element in the longitudinal direction of the vehicle may be less than 150 mm, for example less than 110 mm. The depth is preferably not be less than 15 mm, since otherwise the usable filter area would be very low. In one embodiment of the application, the dimensions of an inflow surface of the ambient air purification device may be, for example, 45 cm (height)×65 cm (width) for a typical mid-size passenger car. Depending on the size of the vehicle, however, significant deviations from this are possible, so that a range of dimensions from 20 cm in width to 120 cm in width and 15 cm in height to 100 cm in height are possible in principle.

According to various embodiments, the filter medium of the filter element of the ambient air purification device may be a single-layer or multi-layer filter medium, which may be water-resistant. It may be a multi-layer medium comprising at least one drainage layer and/or one pre-separator layer. Alternatively or additionally, the filter medium may comprise or consist of glass fibres and/or plastic fibres, in particular polyester and/or polyethylene. Finally, it may also be provided that the filter medium has a porosity gradient in a thickness direction, preferably in such a way that a pore size decreases in the direction of airflow.

According to various embodiments, depending on the design of the filter element (volume flow pressure loss characteristic), it can be achieved in conjunction with the fan that the fine dust emissions of the vehicle are completely compensated by the ambient air cleaning device, so that it is a zero-emission vehicle in terms of dust, e.g., in terms of PM10, PM2.5, or PM1. For a typical medium-class ICE passenger car, the total particulate matter emission is about 25 mg/km.

According to various embodiments, the filter may include a filter frame, for example, at least partially circumferential frame in which the filter element (e.g., filter bellows) is accommodated. In an example, it may be provided that the frame has an L-shaped cross-sectional form, e.g., wherein one leg of the L-shaped cross-section of the frame engages behind the filter bellows of the filter element, and thus supports it counter to the effect of dynamic pressure. The filter may comprise two or more filter elements, and the filter elements may be arranged in (e.g., fixed to) a single filter frame, or alternatively, each filter element may be arranged in a separate frame element of a filter frame.

According to various embodiments, the filter element may in particular comprise or be a plastic-molded filter element, wherein the at least partially circumferential frame may be connected to the filter medium by a material-to-material bond. However, the invention is not limited to a material connection; as an alternative to the material connection of the filter medium to the frame, it may also be provided that the filter element is merely inserted into the frame, so that it is supported in a form-fitting manner on the rear leg of the L-profile.

According to various embodiments, the filter may be arranged (and arrangeable) into the receptacle. The receptacle may be fixed to the vehicle and may corresponds to the frame of the filter, in which the filter is held, optionally by detachable fastening means, e.g., a clip connection. The receptacle may further be configured to function as a mounting shaft, into which the at least one filter element may be linearly inserted. This makes it easy to replace the filter element, for example from the upper side of a lock carrier of a front hood or from an underbody side which is easily accessible, for example, during servicing on a lifting platform.

In some embodiments, it may further be provided that the filter is arranged with respect to a heat exchanger in such a way that it covers no more than 75% of an incident flow surface of the heat exchanger, so that sufficient residual heat dissipation is possible even when the filter element is loaded. In order to achieve this, the filter element can be arranged offset from the heat exchanger about the vertical and/or transverse direction of the vehicle. The non-covered portion of the heat radiator may form a bypass which may be openable and closeable. In other embodiments, the bypass may be an openable/closeable air passage which is independent from the heat exchanger surface, and the filter and the heat exchanger may be apart from each other at a distance sufficiently large to allow flow of air through the heat exchanger when the bypass is open, and even when the filter is loaded.

As used herein and in accordance with various embodiments, a required capacity may also be referred to as a demand, and vice-versa. A demand may be determined from the vehicle emissions, e.g., the current vehicle emissions which may be measured or calculated based on one or more of: engine, fuel parameters, filter status, catalysator status as known in the art.

As used herein and in accordance with various embodiments, a capacity may be determined based on a filter status and filter parameters. For example, filter status could be determined based on the history of the filter usage and/or calibration data. Alternatively or in addition, a capacity could be determined via sensors, example pressure differential measurements across a filter medium, and based on a calibration curve, the filtration capacity can be determined. Other methods for determining remaining filter capacity are known to the skilled person in the art.

According to various embodiments, communication between two vehicles, either directly (vehicle-to-vehicle) or indirectly (e.g., via infrastructure) may be provided by one or more of may operate according to any one or more of the following radio communication technologies and/or standards including but not limited to: Global System for Mobile Communications (GSM) radio communication technology, General Packet Radio Service (GPRS) radio communication technology, Enhanced Data Rates for GSM Evolution (EDGE) radio communication technology, Third Generation Partnership Project (3GPP) radio communication technology, Universal Mobile Telecommunications System (UMTS), UMTS 3G, 3GPP Long Term Evolution (LTE), LTE Advanced, Code division multiple access 2000 (CDM2000), Third Generation (3G), Circuit Switched Data (CSD), High-Speed Circuit-Switched Data (HSCSD), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), 3GPP any of Releases 8 to 17 and subsequent releases (such as Rel. 18, Rel. 19, etc.), 3GPP 5G, 3GPP LTE Extra, LTE-Advanced Pro, LTE Licensed-Assisted Access (LAA), UMTS Terrestrial Radio Access (UTRA), Wideband Integrated Digital Enhanced Network (WiDEN), Unlicensed Mobile Access (UMA), also referred to as 3GPP Generic Access Network, or GAN standard, Bluetooth(®), Bluetooth Low Energy (BLE), IEEE 802.15.4 based protocols (e.g., IPv6 over Low power Wireless Personal Area Networks (6LoWPAN), WirelessHART, MiWi, Thread, 802.11a) WiFi-direct, ANT/ANT+, ZigBee, Z-Wave, 3GPP device-to-device (D2D) or Proximity Services (ProSe), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay), technologies operating above 300 GHz and THz bands, (3GPP/LTE based or IEEE 802.11p and other) V2X communication technologies, 3GPP cellular V2X, DSRC (Dedicated Short Range Communications) communication systems such as Intelligent-Transport-Systems and others, the European ITS-G5 system (i.e. the European implementation of IEEE 802.11p based DSRC, including ITS-GSA, ITS-GSB, ITS-G5C). In addition to the radio communication technologies and/or standards listed above, any number of satellite uplink technologies may be used including, for example, radios compliant with standards issued by the ITU (International Telecommunication Union), or the ETSI (European Telecommunications Standards Institute), Starlink™ among others. The embodiments provided herein are thus understood as being applicable to various other communication technologies, both existing and not yet formulated.

While several embodiments are explained in connection with vehicles, the embodiment detail and explain the air treatment system suitable for use in a vehicle, e.g., to be installed in and/or be part of a vehicle.

Figure 1B:
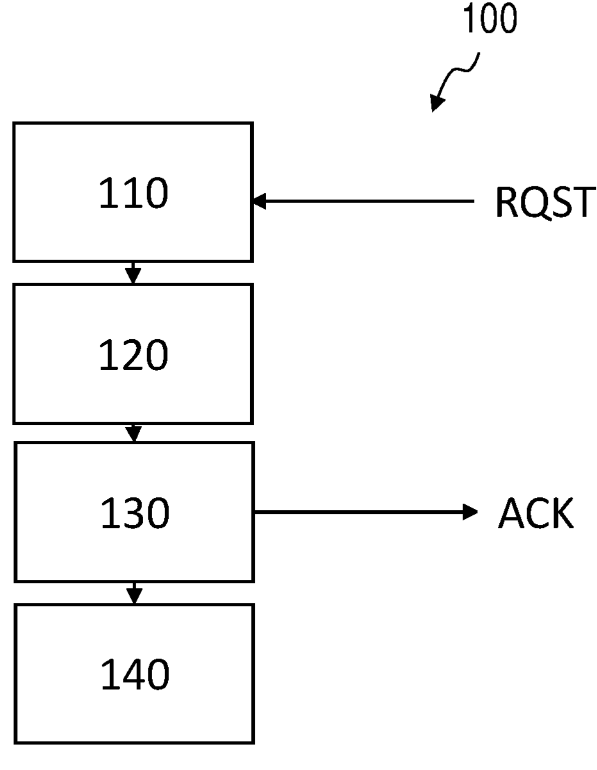

FIGS. 1A and 1B show a vehicle 1 including an air treatment system 10 for treating environment air 5 and a method 100 for treating environment air. The vehicle may further include a control circuit 20 to control the air treatment system 10, the control circuit 20 may be external to or comprised by the air treatment system 10. The vehicle may further include a communication interface 30 configured to wirelessly send and receive data external to the vehicle 1 and operably coupled to the control circuit 20. The communication interface 30 may be as described herein in accordance with various embodiments, and is configured to wirelessly send and receive data via the first communication channel CH1 and the second communication channel CH2. The control circuit 20 may be configured to, via the communication interface 30, and via the second communication channel CH2, receive 110 a request RQST for treatment. The control circuit 20 may be configured to, determine 120 if the air treatment system has an additional treatment capacity available. The control circuit 20 may be configured to, via the communication interface 30, and via the second communication channel CH2, send 130 an acknowledgement ACK if additional treatment capacity is available. The control circuit 20 may be further configured to control 140 the air treatment system 10 to increase treatment capacity. According to various embodiments, treatment includes filtration and treating includes filtering.

According to various embodiments, the communication interface 30 may include a first communication module configured to operate the first communication channel CH1 and a second communication module configured to operate the second communication channel CH2. In some embodiments, the first communication module and the second communication module may be on different integrated circuits. In some embodiments, the first communication module and the second communication module may be on different PCBs, and/or in different housings. Alternatively, the first communication module and the second communication module may be on a same housing, and/or on a same PCB. In some embodiments, the first communication channel's and the second communication channel's interfaces may be implemented one a same integrated circuit package (also known as CHIP), and may, for example, use different antenna modules, or, in another example, a same antenna module with an antenna tuner.

Figure 2:
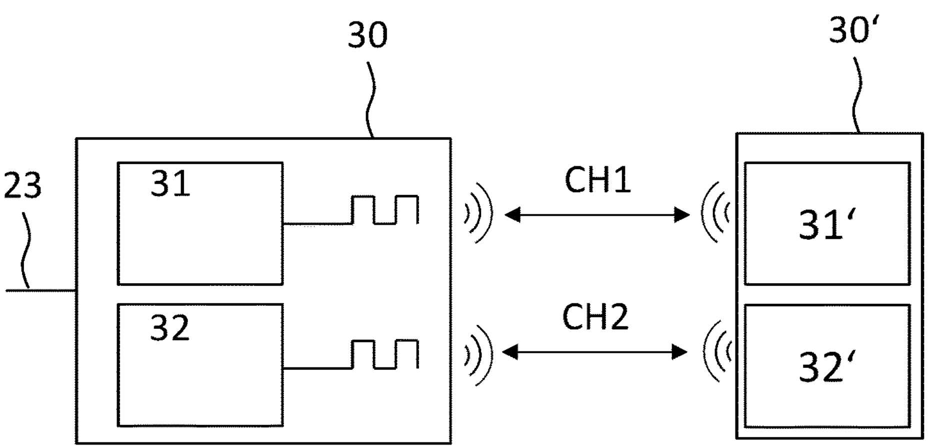
FIG. 2 shows a communication interface 30 which may include a first communication module 31 configured to operate the first communication channel CH1 and a second communication module 32 configured to operate the second communication channel CH2.

As shown in FIG. 2, the communication interface 30 may include a first communication module 31 configured to operate the first communication channel CH1 and a second communication module 32 configured to operate the second communication channel CH2. In some embodiments, each of the first communication module 31 and the second communication module 32 may have a corresponding antenna, in other embodiments, the first communication module 31 and the second communication module 32 may be operably connected to an antenna, for example, via an antenna tuner. The communication interface 30 may be from one vehicle, for example, from a demand vehicle, and the channel may be provided from the one vehicle to an external communication interface 30' comprising a first communication module 31' and a second communication module 32' (antennas are not shown), for example of another vehicle. The communication on the first channel CH1 may be via a direct connection, e.g., a direct vehicle to vehicle connection. The communication on the second channel CH2 may be via a direct connection, e.g., a direct vehicle to vehicle connection. The external communication interface 30' may be configured identically to the communication interface 30 or in a different way, in accordance with various embodiments, and is shown in the figure as example only.

According to some embodiments, a communication coupling 23 between the communication interface 30 to the control circuit 20 may be between a communication interface module (including interfaces 31 and 32) and a control circuit module (e.g., an ECU), for example, on a single cable, or, in another example, a single CAN bus.

Figure 3:
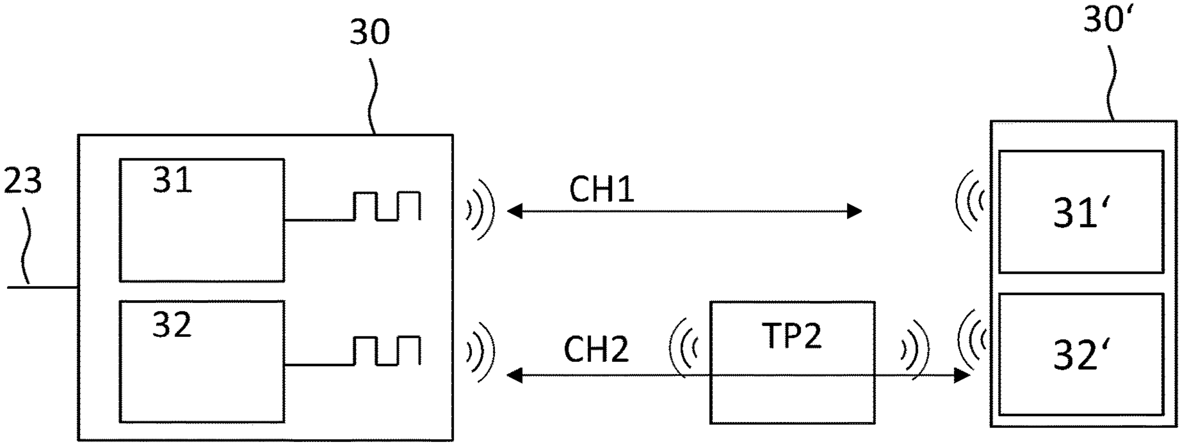
FIG. 3 shows the communication coupling between a communication interface 30 of a vehicle and an external communication interface 30', for example, of another vehicle.

FIG. 3 shows the communication coupling between a communication interface 30 of a vehicle and an external communication interface 30', for example, of another vehicle. As shown in FIG. 3, the communication interface 30 may include a first communication module 31 configured to operate the first communication channel CH1 and a second communication module 32 configured to operate the second communication channel CH2. In some embodiments, each of the first communication module 31 and the second communication module 32 may have a corresponding antenna, in other embodiments, the first communication module 31 and the second communication module 32 may be operably connected to an antenna, for example, via an antenna tuner. The communication interface 30 may be from one vehicle, for example, from a demand vehicle, and the channel may be provided from the one vehicle to an external communication interface 30' comprising a first communication module 31' and a second communication module 32' (antennas are not shown), for example of another vehicle. The communication on the first channel CH1 may be via a direct connection, e.g., a direct vehicle to vehicle connection. The communication on the second channel CH2 may be via an indirect connection, e.g., via an intermediate communication circuit TP2 (such as transponder), the intermediate communication circuit being external to the vehicle and external to the other vehicle. The external communication interface 30' may be configured identically to the communication interface 30 or in a different way, in accordance with various embodiments, and is shown in the figure as example only.

According to some embodiments, a communication coupling 23 between the communication interface 30 to the control circuit 20 may be between a communication interface module (including interfaces 31 and 32) and a control circuit module (e.g., an ECU), for example, on a single cable, or, in another example, a single CAN bus.

Figure 4:
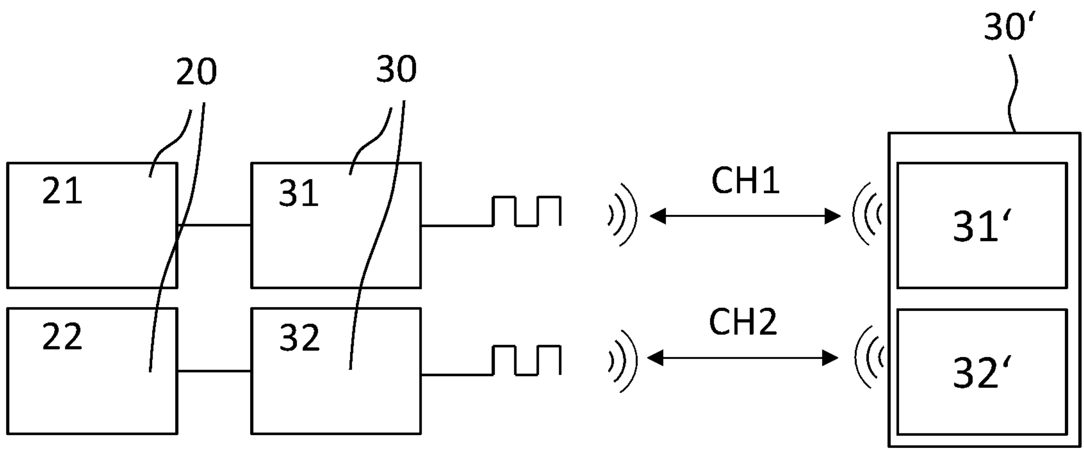
FIG. 4 shows another possible configuration for communication interface 30.

FIG. 4 shows another possible configuration for communication interface 30. FIG. 4 shows the communication coupling between a communication interface 30 of a vehicle and an external communication interface 30', for example, of another vehicle. The control circuit 20 may include a first control circuit 21 operably coupled to the first communication module 31 and a second control circuit 22 operably coupled to the second communication module 32. First communication module 31 and second communication module 32 may be on separate electronic boards or housings from each other. Alternatively, or in addition, first control circuit 21 and second control circuit 22 may be in separate electronic boards or housings from each other. Said operably couplings may be separate and/or independent from each other. Thereby, communication via the first communication channel CH1 may be controlled by the first control circuit 21, which may be implemented as an ECU as an example, and may be advantageous for critical communication. Communication via the second communication channel CH2 may be controlled by the second control circuit 22, which may be implemented as an air treatment controller as an example.

Figure 5:
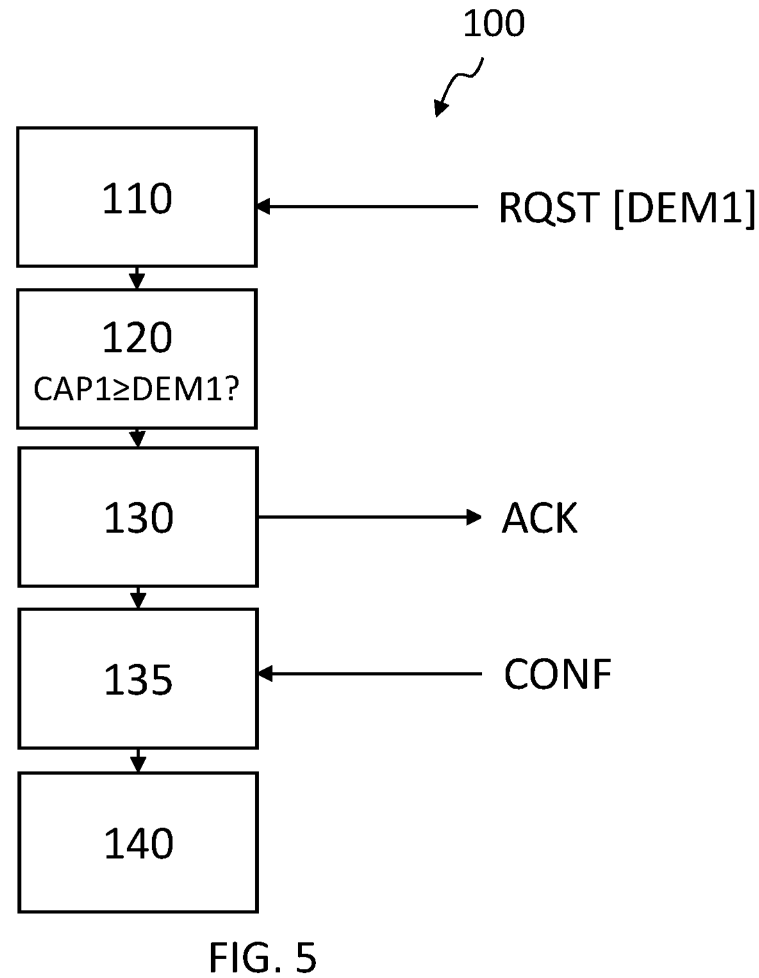
FIG. 5 shows a flow chart of the method of air treatment for illustration purposes.

FIG. 5 shows a flow chart of the method for air treatment in accordance with some embodiments for illustration purposes. A supply vehicle may receive 110 a RQST for treatment capacity via the second communication channel CH2. For example, a demand vehicle of a fleet may determine 202 that there is a demand for air treatment, and send 210 a request RQST for treatment capacity to a supply vehicle via the second communication channel CH2. Said request may include a demand DEM1, e.g., mass of particles to be retained by a filter of the supply vehicle. The supply vehicle may determine 120 that it is able to carry out the air treatment for the demand, for example if a capacity CAP1 of the supply vehicle is greater or equal than the demand DEM1. The supply vehicle may, after the determination, send 130 an acknowledgement ACK (e.g., to the demand vehicle) via the second communication channel CH2 and start performing 140 the air treatment. Alternatively, the supply vehicle may after the determination, send 130 an acknowledgement ACK (e.g., to the demand vehicle) via the second communication channel CH2 and wait to receive 135 a confirmation CONF, and start performing 140 the air treatment only after receiving 135 the confirmation CONF. It is understood that the example is not limiting, and any variations thereto are possible, for example the supply vehicle could send its status data to the demand vehicle and the demand vehicle may carry out determination that the supply vehicle has enough capacity for the demand. Alternatively, some of the determinations may be performed exterior to any of the vehicles, e.g., in a cloud to which both vehicles communicate.

According to various embodiments, to receive 110 a request for treatment RQST may include to receive data indicative of a demand DEM1 (i.e., a required capacity). Determine 120 if the air treatment system has additional treatment capacity available may include determine whether the additional treatment capacity CAP1 is greater or equal to the demand DEM1. For example, the capacity could be a capacity per pre-determined time slot, e.g., provided by a "heartbeat" clock used by the control circuit, which could also be known, pre-determined, and/or transmitted to the demand vehicle. Another timing could be used, e.g., a time frame for treatment could be determined during by a communication handshaking.

Figure 6:
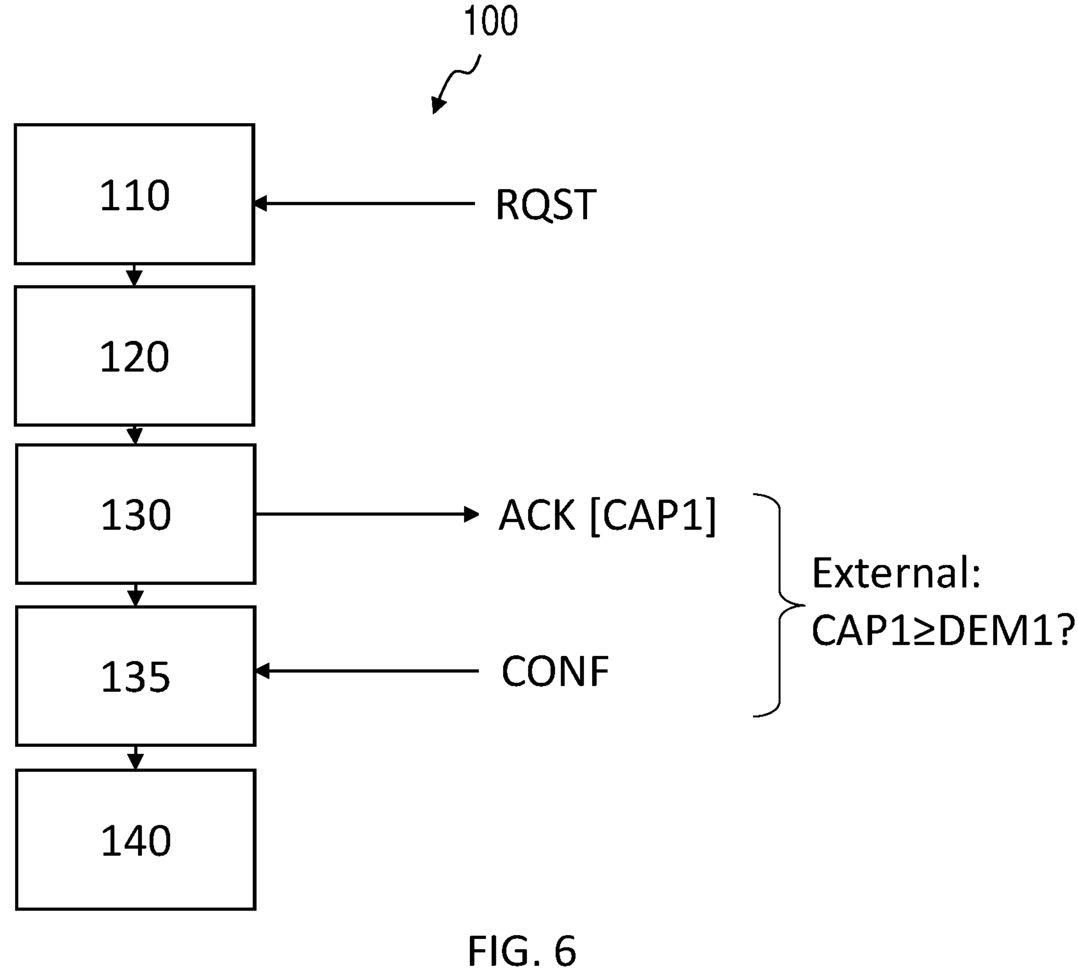
FIG. 6 shows a flow chart of another method of air treatment for illustration purposes.

FIG. 6 shows a flow chart of another method in accordance with some embodiments for illustration purposes. A supply vehicle may receive 110 a RQST for treatment capacity. For example, a demand vehicle of a fleet may determine 202 that there is a demand DEM1 for air treatment, and send 210 a request RQST for treatment capacity to a supply vehicle. The supply vehicle may determine 120 that there is a capacity CAP1 greater than zero, e.g., in the form of a mass of particles to be retained by a filter of the supply vehicle. The supply vehicle may, after the determination, send 130 an acknowledgement ACK (e.g., to the demand vehicle), which may include the capacity CAP1. The supply vehicle may receive a confirmation CONF, for example, the demand vehicle may compare the CAP1 with its demand and determine whether it can use CAP1 (e.g., it may be sufficient to cover the demand or a portion of the demand, CAP1≥DEM1?) and send the confirmation CONF to the supply vehicle. The supply vehicle may start performing 140 the air treatment after receiving the confirmation CONF. It is understood that the example is not limiting any variations thereto are possible, for example the supply vehicle could send its status data to the demand vehicle and the demand vehicle may carry out determination that the supply vehicle has enough capacity for the demand. Alternatively, some of the determinations may be performed exterior to any of the vehicles, e.g., in a cloud to which both vehicles communicate. In another variation, the supply vehicle may be configured carry out different method variations depending on the type or format of request received, for example, the supply vehicle may be configured to receive a request for air treatment RQST, in the case the request is without demand data the supply vehicle may send the available capacity, and in the case that the request includes demand data, the supply vehicle may perform the determination if capacity<=demand, and only send an acknowledgement ACK if the determination is positive or, optionally send a partial acknowledgement with the capacity<demand. This allows for flexibility, since the demand vehicle may have different reasons for requesting capacity, while a first require may need a limited capacity a second reason may require any available capacity. Thus, overall air treatment may be improved given that the method and the control circuit accept various types of requests.

According to some embodiments, the acknowledgement ACK may include data indicative of a cost rate of the additional treatment capacity. According to various embodiments, the control circuit 20 may be further configured to, before to control 140 the air treatment system to increase treatment capacity, receive 135 a request confirmation CONF. The confirmation may include a microtransaction (such as a micropayment) or micropayment indication data.

Figure 7:
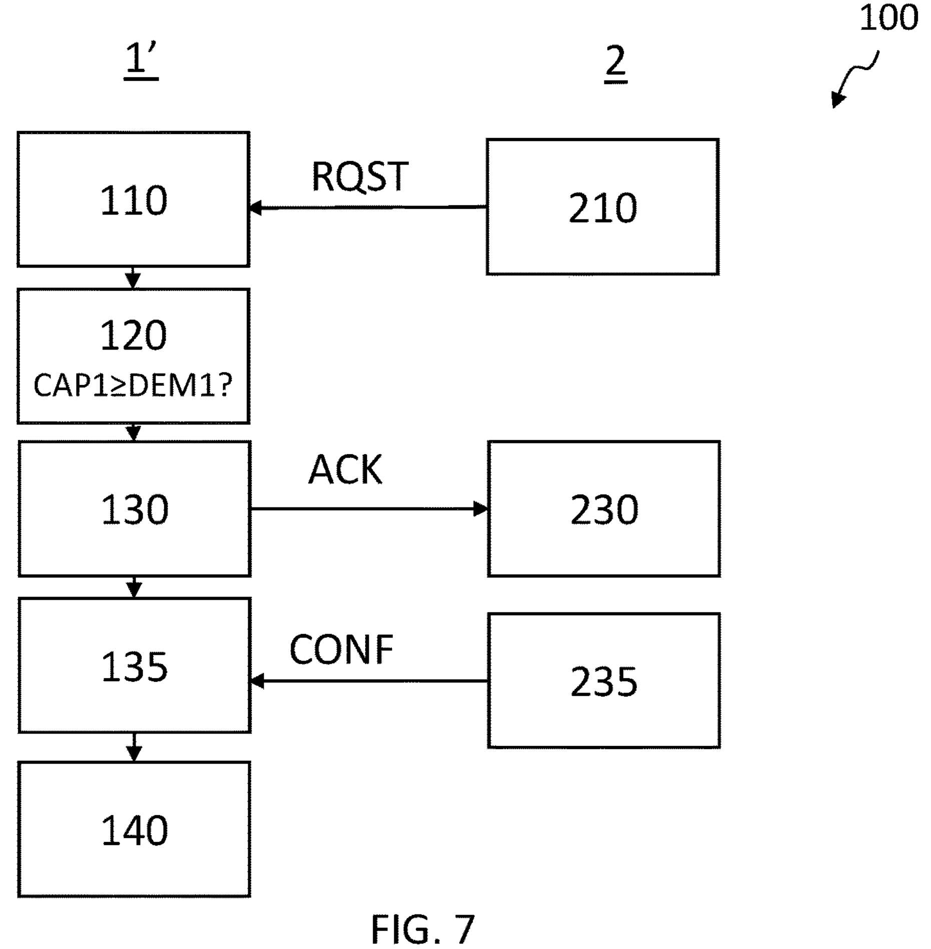
FIG. 7 illustrates how the method of treating environmental air may be run concomitantly for the demand and the supply side.

While some of the previous figures mainly focus on the illustration either of demand or supply vehicle (without being limited thereto), FIG. 7 is used to illustrated how the method of treating environmental air may be run concomitantly for the demand and the supply side.

According to various embodiments, the method 100 may further include sending 210, by the demand vehicle 2 and via the second communication channel CH2, a request RQST' for air treatment by a communication interface 30 to a supply vehicle 1'. The method 100 may include receiving 110, by a communication interface 30 of a supply vehicle 1' and via the second communication channel CH2, a request RQST for treatment from a demand vehicle 2. The method 100 may further include determining 120, by a control circuit 20 of the supply vehicle 1', that an air treatment system 10 has an additional treatment capacity available. The method 100 may further include sending 130, by the communication interface 30 of the supply vehicle 1' and via the second communication channel CH2, an acknowledgement ACK from the supply vehicle 1'. The method 100 may further include receiving 230, by the demand vehicle 2 and via the second communication channel CH2, an acknowledgement ACK from the supply vehicle 1'. In some embodiments, the method may include, sending 235, by the demand vehicle 2 and via the second communication channel CH2, a confirmation CONF and receiving 135, by the supply vehicle 1' and via the second communication channel CH2, the confirmation CONF, by such further step, it is possible, e.g., to send with the ACK an available capacity, and the supply vehicle 1' has the option to confirm that it will use the available capacity. The method 100 may further include by the control circuit 20 of the supply vehicle 1', controlling 140 the air treatment system 10 of the supply vehicle 1' to increase treatment capacity. Controlling 140 the air treatment system 10 may include operating the air treatment system.

In some embodiments, the demand vehicle 2 and the supply vehicle 1' may communicate one or more movement data, e.g., routing or velocity vectors, which may serve for determining a distance or an overlap of the second vehicle within a desired region of the first vehicle, such as a radius of a circle centered on the first vehicle, or a region in which the first vehicle has passed or will pass within a predetermine time. For example movement data of the demand vehicle 2 may be transmitted to the supply vehicle 1' for determination of distance at the supply vehicle 1', movement data of the supply vehicle 1' may be transmitted to the demand vehicle 2 for determination of distance at the demand vehicle 2, and/or movement data of the supply vehicle 1' and the demand vehicle 2 may be sent to a processor exterior to both vehicles (e.g., a cloud our another vehicle) for determination of distance.

According to various embodiments, the method 100 may further include, e.g., by the demand vehicle 2, determining that there is an air treatment demand by determining that there is a local treatment requirement unsatisfied by the air treatment system, before sending 210 the request for air treatment. In this context, the term "local" means from the demand vehicle 2.

According to various embodiments, the method 100 may further include recording 250, on a local memory of the supply vehicle 1', data indicative of the additional treatment capacity utilized. According to various embodiments, the acknowledgement ACK may include data indicative of an additional treatment capacity CAP1. According to various embodiments, controlling 140 the air treatment system 10 to increase treatment capacity may include the meaning to increase the treatment capacity by the additional treatment capacity CAP1. According to various embodiments, receiving 110 a request for treatment may include receiving data indicative of a demand DEM1 (in other words, a required capacity). Determining 120 that the air treatment system has additional treatment capacity available may include determining that the additional treatment capacity CAP1 is greater or equal to the demand DEM1.

According to various embodiments, the method 100 may further include before controlling 140 the air treatment system to increase treatment capacity, receiving, via the second communication channel CH2, a request confirmation CONF, optionally including a microtransaction (such as a micropayment) or micropayment indication data. The acknowledgement ACK may include data indicative of a cost rate of the additional treatment capacity.

According to various embodiments, a vehicle may be configured as a demand vehicle configured to and capable of carrying out the process of requesting remote treatment, or may be configured to and capable of carrying out the process of receiving a request for treatment and carrying out the treatment, or may be configured to perform to and capable of carrying out both processes, thus functioning at a time as a demand vehicle and at another time as a supply vehicle, as needed.

According to various embodiments, the acknowledgement ACK, ACK' may include data indicative of the additional treatment capacity CAP1. According to various embodiments, to increase treatment capacity may mean to increase treatment capacity by the additional treatment capacity CAP1.

According to various embodiments, a control circuit may be configured to and capable of determining that there is a demand for air treatment. Such determination may be due to different factors, for example, a net emission category of the vehicle requires that its fine dust ambient air filter is working, however the fine dust ambient air filter may be almost fully loaded, and therefore the filter lifetime can be stretched by utilizing remote air treatment.

Figure 8:
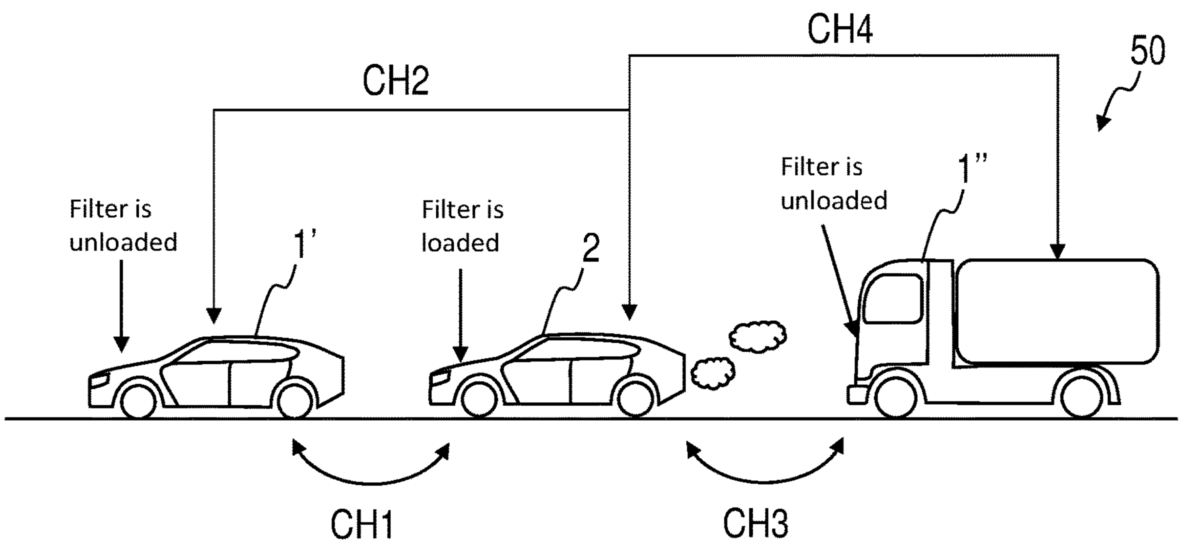
FIG. 8 shows a fleet of vehicles for illustration purposes.

FIG. 8 shows a fleet of vehicles for illustration purposes. Various embodiments concern a fleet 50 of two or more vehicles 2, 1' in accordance with various embodiments. The two or more vehicles 2, 1' may be configured to operably communicable with each other, The first vehicle 2 (demand vehicle) may be configured to requesting a second vehicle 1'

(supply vehicle) to provide air treatment via channel CH2, and the second vehicle 1' may be configured to receive the request via channel CH2 and control an air treatment system of the second vehicle 1' to increase treatment capacity in accordance with various embodiments.

According to various embodiments, the fleet 50 may include three or more vehicles 2, 1', 1". Communication between vehicle 1' and vehicle 2 may be provided by a first communication channel CH1 and a second communication channel CH2. Communication between vehicle 2 and vehicle 1" may be provided by an additional first communication channel CH3 and an additional second communication channel CH4. Each of channels CH1 and CH3 are configured to work as a first communication channel, and wherein each of channels CH2 and CH4 are configured to work as a second communication channel. Similarly, vehicle 1" may communicate with vehicle 1' via first and second communication channels. A first vehicle 2 may be configured to request a plurality of vehicles 1', 1", including at least a second vehicle 1', to provide air treatment, and wherein each vehicle of the plurality of vehicles 1', 1" is configured to receiving the request and control a respective air treatment system to increase treatment capacity in accordance with various embodiments. Thus, vehicles 1' and 1" may compensate a net emission from the first vehicle 2. Other vehicles (e.g., not configured according to the present disclosure) may be part of local traffic but not part of the fleet.

Figure 9:
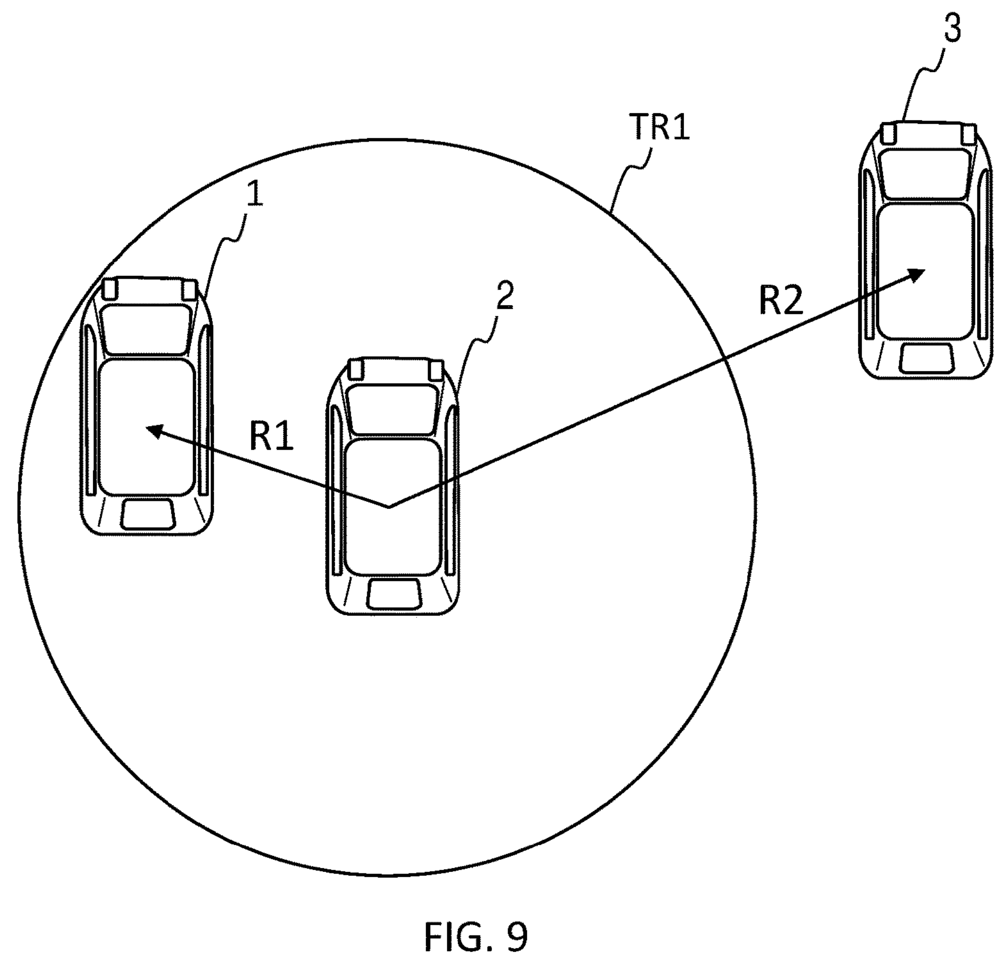
FIG. 9 shows a schematic illustration of a fleet including vehicles 1, 2, and 3.

FIG. 9 shows a schematic illustration of a fleet including vehicles 1, 2, and 3 in accordance with various embodiments. Vehicle 2 may be a demand vehicle and may be configured to send a request for air treatment to supply vehicles 1 and 3. The method may include determining whether supply vehicles 1 and 3 are within a predetermined radius TR1 for air treatment, wherein the pre-determined radius TR1 is centered on the demand vehicle 2. The center of the pre-determined radius TR1 may be on a pre-determined position of the vehicle, for example, at the location of the antenna of or connected to the communication interface and used for the communication. A distance of a demand vehicle to the center of the circle with pre-determined radius TR1 may be determined from the center to a pre-determined position of the vehicle, e.g., at the location of the antenna of or connected to the communication interface and used for the communication, of the supply vehicle. For the illustrated pre-determined radius TR1 it can be seen that vehicle 1 is at a radius R1 which is within the pre-determined radius TR1. In comparison vehicle 3 is at a radius R2 which is greater than TR1. Therefore, even if communication may be established between supply vehicle 2 and demand vehicle 1, and supply vehicle 2 and demand vehicle 3, the determination would result in that the vehicle 2 is determined to be within the pre-determined radius TR1 and that the vehicle 3 is not within the pre-determined radius TR1. Thus, supply vehicle 1 may provide air treatment, while supply vehicle 3 may not provide air treatment, e.g., by not receiving a request RQST, by not receiving a confirmation CONF, by not sending an acknowledgement ACK, or a combination thereof.

According to various embodiments, the method may include determining whether a supply vehicle's route passes through (e.g., overlaps) with a route of the demand vehicle even if at different times, e.g., different times of a day. Alternatively or in addition, the method may include determining whether a supply vehicle's passes at or close (within the pre-determined radius) a previous position of a demand vehicle, for example, by matching positions of supply vehicle and demand vehicle.

Figure 10:
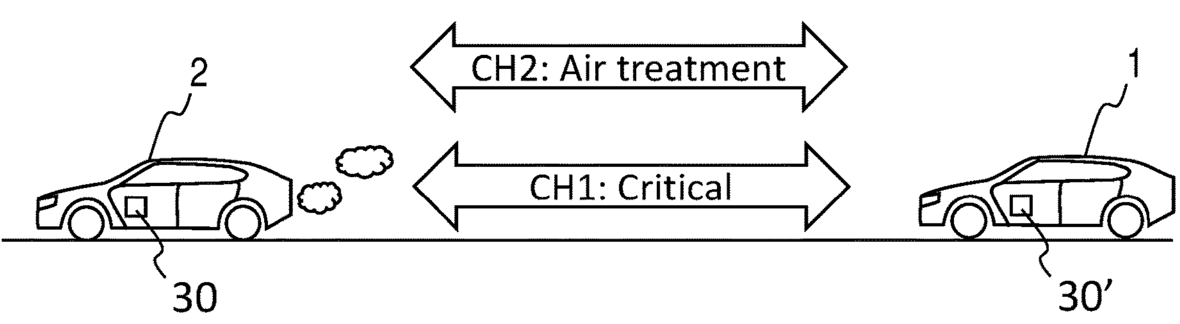
FIG. 10 shows a schematic illustration of a fleet including vehicles 1' and 2.

FIG. 10 shows a schematic illustration of a fleet including vehicles 1' and 2 in accordance with various embodiments. At a time t1 the demand vehicle may be at a position P1. The method may include determining which other vehicles of the fleet have a route that pass through or close by (e.g., within the pre-determined radius) of position P1 at a future time t2, which may include determining that at least one supply vehicle 1' passes at or close to the position P1 at a time t2. In one example, the determining includes sending a request RQST and may further include receiving route data or position confirmation for a future time, e.g., in the form of "[P1, t2]". The method may further include sending the request for air treatment from the demand vehicle 2 to the supply vehicle 1' at a time before t2 (e.g., at a time t1) and carrying out the air treatment by the supply vehicle 1' at a time t2. Thereby, air at position P1 may be treated and the air quality improved even if no supply vehicles are within the pre-determined radius at the time t1 in which the demand vehicle 2 passes at the position P1. The determining which other vehicles of the fleet have a route that pass through or close by of position P1 at a future time t2 may include determining limiting time t2 to within a pre-determined time frame or time slot, e.g., to a same day, or to a same period of time, for example within a period of time selected from 1 h to 24 h (endpoints included), for example within 24 h.

In accordance with various embodiments, a distance between two vehicles may be determined by any known automated means, such as a radar, lidar, or RSSI signal. For example, using a Received Signal Strength Indicator (RSSI) of a known transmitter, such as bluetooth, e.g., bluetooth 5.1 and above, or others. Triangulation among 3 or more receivers with known position (e.g., GPS) may be used to determine more precise positions if needed. Alternatively or in addition, phase measurements by multiple antennas (2 or more, or an array) may be used to obtaining the direction, which combined with RSSI may give a position of the emitter.

As illustrated in FIG. 10, both vehicles 2 and 1' are configured to stablish communication via the second communication channel CH2, which may be used to communicate air treatment data, such as: request for air treatment, demand, capacity, micropayment, a combination thereof, etc. Both vehicles are configured to stablish communication via the first communication channel CH1, which may be used for driving data communication, and other kinds of data transfer that require low latency and/or high reliability. Examples, of driving data to be communicate among the vehicles 2 and 1 include one or more of: braking information from another vehicle, platooning information with another vehicle, traffic ahead of vehicle in front information, infrastructure data indicative of traffic light change, and others.

For example, braking information may be needed to avoid collision, thus, a low latency may be needed, especially in sudden braking and/or platooning where inter-vehicle distance is smaller. This may be helpful for self-driving and driving assistance for collision avoidance.

In another example, platooning information may indicate that vehicles have a substantially equal velocity and keep a certain distance range from each other. A change in speed or distance from one of the platooning vehicles may affect the other vehicle, for example, if a vehicle in front speeds up, the vehicle behind (e.g., its control circuit which may be operating self-driving or driving assistance) may speed up as well to keep within the distance range. This may be helpful for self-driving or platooning driving assistance.

In yet another example, traffic ahead of vehicle in front information may mean that a vehicle is relaying the information of the traffic in front of it (e.g., distance, relative speed, and/or brake light status of the vehicle in front) to a vehicle behind it. Thus, the vehicle behind (e.g., its control circuit which may be operating self-driving or driving assistance) may be warned on sudden braking or may use such information for overtaking decisions.

In yet another example, infrastructure data indicative of traffic light change may be provided, e.g., by a traffic light, by a telecommunication network from a cloud that has traffic light information, or other road side telecommunication infrastructure. Thus, the vehicle (e.g., its control circuit) may receive the information about the timing of traffic light changing, and the driving may be adapted based on such information, for example, the vehicle may speed down knowing that a traffic light will open soon, to avoid complete stop, or may slow down or speed up (depending on the case and speed limits) knowing that a traffic light is about to close.

Figure 11:
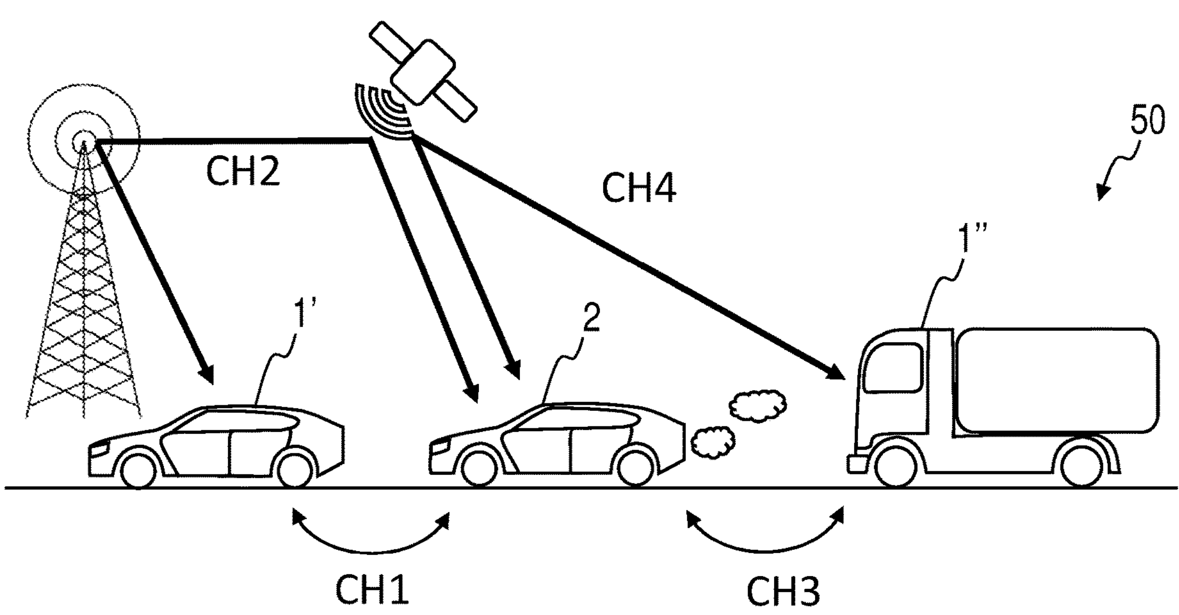
FIG. 11 shows another schematic fleet of vehicles, for illustration purposes.

FIG. 11 shows a fleet of vehicles in accordance with various embodiments, for illustration purposes. Various embodiments concern a fleet 50 of two or more vehicles 2, 1', 1" in accordance with various embodiments. The two or more vehicles 2, 1', 1" may be configured to operably communicable with each other. Communication between vehicle 1' and vehicle 2 may be provided by a first communication channel CH1 and a second communication channel CH2. Communication between vehicle 2 and vehicle 1" may be provided by an additional first communication channel CH3 and an additional second communication channel CH4. Each of channels CH1 and CH3 are configured to work as a first communication channel, and wherein each of channels CH2 and CH4 are configured to work as a second communication channel. Similarly, vehicle 1" may communicate with vehicle 1' via first and second communication channels. A first vehicle 2 may be configured to request a plurality of vehicles 1', 1", including at least a second vehicle 1', to provide air treatment, and wherein each vehicle of the plurality of vehicles 1', 1" is configured to receiving the request and control a respective air treatment system to increase treatment capacity in accordance with various embodiments. Thus, vehicles 1' and 1" may compensate a net emission from the first vehicle 2. Other vehicles (e.g., not configured according to the present disclosure) may be part of local traffic but not part of the fleet. In some embodiments the first communication channel (CH1, CH3) may be configured as direct communication between the two or more vehicles 2, 1', 1", such as via vehicle-to-vehicle communication VV; for example directly (free of any transponder or transceiver, external to the vehicles). Alternatively or in addition, the two or more vehicles 2, 1', 1" may communicate with each other via infrastructure external to the vehicle, such as a satellite (vehicle to satellite communication VS), mobile phone network VT, a transponder, a transceiver, or a combination thereof, for example, the communication may further be via a server, e.g. in a cloud, thereby providing the second communication channel CH2.

Figure 12:
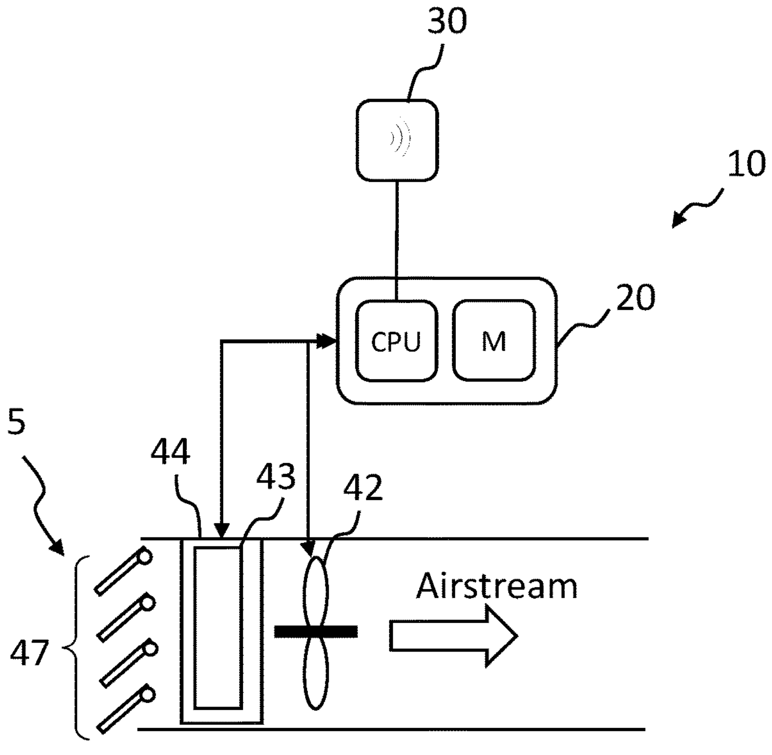
FIG. 12 shows a schematic of an embodiment of an air treatment system 10 for cleaning environmental air.

FIG. 12 shows a schematic of an embodiment of an air treatment system 10 for cleaning environmental air. The schematic is simplified for easier explanation of the disclosure. The air treatment system 10 may include a receptacle 44 configured to receive a filter 43. As can be seen, when filter 43 is installed in the receptacle 44 it is in stream a blower 42 (e.g., a fan) of a vehicle 1 in an airstream when air is flowing through the filter 43. The air treatment system 10 may include a control circuit 20. The control circuit 20 may include a computer memory M storing instructions to cause a microprocessor CPU to carry out the method in accordance with various embodiments. Further or alternatively to the shutter 47, the air treatment system 10 of FIG. 12 may include an additional shutter and/or a bypass. The air treatment system 10 may further include the filter 43. A blower may also be dispensed with, and the airflow through the filter may be generated when the vehicle 1 is in movement.

Various embodiments of the disclosure enable a vehicle to receive emissions, such as particle emission, compensation from other vehicles. Compensation may also be at a same location, another location, or another time for the same location. Compensation performed at the vicinity of the vehicle can avoid pollution peaks effectively creating a cleaner vehicle, when the neighboring cars, or cars passing right before or shortly after at the same location, of a fleet may provide the necessary air treatment.

The invention claimed is:

1. A vehicle comprising:

an air treatment system for treating environmental air;

a control circuit;

a communication interface configured to wirelessly send and receive data and operably coupled to the control circuit, wherein the control circuit is configured to:

via the communication interface, receive a request for a treatment;

determine if the air treatment system has an additional treatment capacity available;

via the communication interface, send an acknowledgement if the additional treatment capacity is available; and control the air treatment system to increase a treatment capacity, wherein the communication interface comprises a first communication channel and a second communication channel, wherein the second communication channel is configured to wirelessly send and receive air treatment data, comprising the receiving the request for treatment and sending the acknowledgement, and wherein the first communication channel has a lower latency than the second communication channel and/or the first communication channel has a higher reliability than the second communication channel.

2. The vehicle of claim 1, wherein the first communication channel is configured to wirelessly send an RF signal from the vehicle and to wirelessly receive the same RF signal sent by another vehicle.

3. The vehicle of claim 1, wherein the second communication channel is configured to wirelessly send data from the vehicle and to wirelessly receive the same data sent by another vehicle using an intermediate communication circuit external to the vehicle and to the another vehicle.

4. The vehicle of claim 1 wherein the communication interface comprises a first communication module configured to operate the first communication channel and a second communication module configured to operate the second communication channel.

5. The vehicle of claim 1, wherein the control circuit is further configured to determine if there is a treatment demand when a local treatment requirement is unsatisfied.

6. The vehicle of claim 1, wherein the acknowledgement comprises data indicative of a cost rate of the additional treatment capacity, and wherein the control circuit is further configured, before controlling the air treatment system to increase the treatment capacity, to receive a request confirmation.

7. The vehicle of claim 1, further comprising a driving assistant circuit and/or an autonomous driving circuit, which is operably connected to the communication interface and configured to wirelessly send a driving data and to wirelessly receive the driving data.

8. The vehicle of claim 1, wherein the control circuit is configured to operate the first communication channel and the second communication channel simultaneously and independently of each other.

9. A fleet comprising two or more of the vehicle according to claim 1 operably communicable with each other, wherein a first vehicle of the two or more vehicles is configured to, via the second communication channel of the first vehicle, request a second vehicle of the two or more vehicles to provide an air treatment, and wherein the second vehicle is configured to, via the second communication channel of the second vehicle, receive the request to provide the air treatment and to control the air treatment system of the second vehicle to increase the treatment capacity.

10. The fleet according to claim 9, wherein the first vehicle is configured to, via the second communication channel of the first vehicle, request a plurality of vehicles, comprising at least the second vehicle, to provide the air treatment, and wherein each vehicle of the plurality of vehicles is capable of receiving the request to provide the air treatment and controlling a respective air treatment system to increase the treatment capacity.

11. The fleet according to claim 9, wherein the control circuit of the first vehicle and/or the control circuit of the second vehicle is configured to operate the first communication channel and the second communication channel simultaneously and independently of each other.

12. The vehicle of claim 1, wherein the treatment comprises filtration and the treating environmental air comprises filtering.

13. The fleet according to claim 9, wherein the treatment comprises filtration and the treating environmental air comprises filtering.

14. A method of treating environmental air by a supply vehicle configured to communicate with a communication interface via a first communication channel and a second communication channel, the method comprising:

receiving, by the supply vehicle and via the second communication channel of the supply vehicle, a request for a treatment;

determining, by a control circuit of the supply vehicle, that an air treatment system of the supply vehicle has an additional treatment capacity available;

sending, via the second communication channel of the supply vehicle, an acknowledgement if the additional treatment capacity is available; and controlling, by the control circuit of the supply vehicle, the air treatment system of the supply vehicle to increase a treatment capacity, wherein the first communication channel of the supply vehicle has a lower latency and/or a higher reliability than the second communication channel of the supply vehicle.

15. The method of claim 14, further comprising:

sending, by a demand vehicle via the communication interface, a request for an air treatment to the supply vehicle; and receiving, by the demand vehicle via the communication Interface and via the second communication channel, an acknowledgement from the supply vehicle.

16. The method of claim 15, further comprising, determining, by the demand vehicle, that there is an air treatment demand by determining that there is a local treatment requirement unsatisfied, before sending the request for the air treatment.

17. The method of claim 15, further comprising recording, on a local memory of the supply vehicle, data indicative of an additional treatment capacity utilized.

18. The method of claim 15, wherein receiving the request for treatment comprises receiving data indicative of a demand, and wherein, determining that the air treatment system has the additional treatment capacity available comprises determining that the additional treatment capacity is greater than or equal to the demand.

19. The method of claim 14, wherein the control circuit is configured to operate the first communication channel and/or the second communication channel simultaneously and independently of each other.

20. The method of claim 14, wherein the treatment comprises filtration and the treating environmental air comprises filtering.

* * * * *